United States Patent Office 2,753,369
Patented July 3, 1956

2,753,369

PURIFICATION OF DIMETHYL TEREPHTHALATE

Robert H. Sullivan, Woodbury, N. J., assignor to E. I. du Pont de Nemours and Company, Wilmington, Del., a corporation of Delaware No Drawing. Application July 9, 1953,
Serial No. 367,117

2 Claims. (Cl. 260—475)

The present invention relates to a process for the purification of high molecular weight organic esters. More specifically, the present invention relates to a process for the removal of color-producing and light-absorbing impurities from dimethyl terephthalate.

Dimethyl terephthalate is used for the production of polyethylene terephthalate suitable for use as fabrics, films, fibers, coating compositions and the like. These polymers preferably are free of undesirable color characteristics, hence the dimethyl terephthalate to be used in their preparation should be free of any impurities capable of producing poor polymer color. No completely satisfactory process for removing all of the color-producing components from crude dimethyl terephthalate has been known to the prior art. Refined dimethyl terephthalate obtained by distillation at either atmospheric or reduced pressure may still produce polymers with inferior color characteristics. Polymers with somewhat improved color characteristics may be obtained by crystallization of dimethyl terephthalate from suitable solvents, but the recovery of the purified ester is poor due to losses by heat degradation and coprecipitation with impurities. Poor yields of purified dimethyl terephthalate are also obtained by vacuum sublimation of the crude ester.

Dimethyl terephthalate prepared by the esterification of terephthalic acid produced by the oxidation of xylenes with nitric acid, as disclosed in U. S. Patent 2,636,899, issued April 28, 1943, may be contaminated with nitrated and oxidized products such as nitroxylenes, aldehydes, acids, and nitro acids. Although the usual methods of purification will remove the major part of these impurities, trace amounts, sufficient to interfere with the polymer quality, may remain. These trace amounts of impurities can be measured by both the degree of light transmittance at a wavelength of 340 m$\mu$ and the polymer color number (obtained by a color comparison of the molten polymer with "Pontamine" dye (catechu-3-9, i. e., $C_{15}H_{14}O_2$) solutions of various concentrations). The major amount of light absorption is due to a fluorescent component, believed to be dimethyl hydroxyterephthalate. Since the light transmittance for various concentrations of dimethyl hydroxyterephthalate can be determined, it is possible to calculate the amount of light transmittance due to the other impurities in the dimethyl terephthalate by difference. The fluorescent impurity does not interfere with the polymer color, therefore the polymer color number is a direct measurement of the amount of color-producing impurities.

An object of the present invention is to provide a process for the purification of dimethyl terephthalate. Another object of the present invention is to provide an efficient process for obtaining a refined dimethyl terephthalate suitable for use in the manufacture of high molecular weight polyesters. Additional objects will become apparent as the invention is further described.

I have found that the foregoing objects can be accomplished by bringing a solution of dimethyl terephthalate in a water-insoluble organic solvent in intimate contact with an alkali metal hydroxide.

In accordance with the process of this invention, a solution of dimethyl terephthalate in a water-insoluble organic solvent is passed through a column in concurrent or countercurrent flow to a dilute, i. e., 0.5–5%, aqueous solution of sodium hydroxide. Low temperature and short contact time, e. g., about five minutes, are preferred in order to minimize the loss of dimethyl terephthalate by hydrolysis. An alternate method for carrying out the process of this invention comprises passing a solution of dimethyl terephthalate in a relatively nonpolar solvent, preferably chloroform, through a column packed with solid sodium hydroxide. The sodium hydroxide is preferably wet with solvent to minimize hydrolysis of the dimethyl terephthalate.

The alkali metal hydroxides preferred for use in this invention are sodium hydroxide and potassium hydroxide. Strongly basic solutions are required. Attempts to carry out the process of the invention by means of a solution of sodium bicarbonate at a pH of 8.0 or a solution of sodium hydroxide at a pH of 10.5 gave poor results.

Thus, according to the process of this invention, trace amounts of nitro compounds and oxidized products capable of producing polymers with poor color characteristics can be removed from dimethyl terephthalate. For example, when distilled dimethyl terephthalate having a nitro-nitrogen content of 0.005% and an aldehydic content of 0.0023% was dissolved in chloroform and brought into intimate contact with a 1% sodium hydroxide solution, 95% of the nitro compounds and 50% of the aldehydic material was removed.

The following examples illustrate specific embodiments of the method of carrying out the present invention. It should be understood, however, that they are illustrative only, and are not to be taken as limiting the invention. The purity of the dimethyl terephthalate is considered on the basis of the percentage of light transmittance at 340 m$\mu$ and the polymer color number. High percentages of light transmittance and low polymer color numbers are desirable.

*Example 1*

Dimethyl terephthalate (214 g.) having a light transmittance of 340 m$\mu$ of 26% and a polymer color of 7 was dissolved in 1250 ml. of chloroform, and passed through a column in countercurrent flow with 1250 ml. of a 1% sodium hydroxide solution at a contact time of 5 minutes. The dimethyl terephthalate (213 g.) recovered after evaporation of the solvent had a light transmittance at 340 m$\mu$ of 72% and a polymer color of 5.

*Example 2*

Dimethyl terephthalate (100 g.) having a light transmittance at 340 m$\mu$ of 34%, and a polymer color of 5 was dissolved in 1000 ml. of chloroform and passed through a column with agitation in countercurrent flow with a 5% sodium hydroxide solution at a contact time of 5 minutes. The dimethyl terephthalate obtained after removal of the solvent had a light transmittance of 340 m$\mu$ of 79% and a polymer color of 3.

Although the invention has been described in detail in the foregoing description, it will be apparent that many variations can be made without departing from the basic concept of the invention. I intend, therefore, to be limited only in accordance with the following claims.

I claim:

1. A process for removing color-forming and light-absorbing impurities from dimethyl terephthalate comprising dissolving the dimethyl terephthalate in chloroform and bringing the solution in intimate contact with an 0.5 to 5% aqueous solution of alkali metal hydroxide.

2. A process for removing trace amounts of color-forming and light-absorbing impurities from dimethyl terephthalate comprising dissolving the dimethyl terephthalate in chloroform and bringing the solution in intimate contact with a 0.5 to 5% aqueous solution of sodium hydroxide for substantially five minutes.

References Cited in the file of this patent

UNITED STATES PATENTS

| | | |
|---|---|---|
| 1,899,919 | Dvornikoff | Feb. 28, 1933 |
| 2,131,925 | Ware | Oct. 4, 1938 |